United States Patent
MacInnis

(10) Patent No.: US 8,428,349 B2
(45) Date of Patent: Apr. 23, 2013

(54) METHOD AND APPARATUS FOR DRAM 2D VIDEO WORD FORMATTING

(75) Inventor: Alexander MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 1869 days.

(21) Appl. No.: 10/850,130

(22) Filed: May 20, 2004

(65) Prior Publication Data

US 2004/0246266 A1 Dec. 9, 2004

Related U.S. Application Data

(60) Provisional application No. 60/472,182, filed on May 21, 2003.

(51) Int. Cl.
G06K 9/36 (2006.01)

(52) U.S. Cl.
USPC .......................................... 382/166; 382/235

(58) Field of Classification Search .................. 382/166, 382/235
See application file for complete search history.

(56) References Cited

U.S. PATENT DOCUMENTS

| | | | | |
|---|---|---|---|---|
| 5,406,311 A * | 4/1995 | Michelson | 345/547 |
| 5,581,310 A * | 12/1996 | Vinekar et al. | 348/718 |
| 5,598,526 A * | 1/1997 | Daniel et al. | 345/540 |
| 5,642,460 A * | 6/1997 | Shimoda | 386/124 |
| 5,654,773 A * | 8/1997 | Kajimoto et al. | 348/717 |
| 5,675,387 A * | 10/1997 | Hoogenboom et al. | 375/240.15 |
| 5,781,242 A * | 7/1998 | Kondo et al. | 348/441 |
| 5,798,948 A * | 8/1998 | Rashkovskiy et al. | 348/620 |
| 5,850,483 A * | 12/1998 | Takabatake et al. | 382/233 |
| 5,909,250 A * | 6/1999 | Hardiman | 375/240.03 |
| 5,920,352 A * | 7/1999 | Inoue | 348/384.1 |
| 5,926,223 A * | 7/1999 | Hardiman | 375/240.03 |
| 6,028,612 A * | 2/2000 | Balakrishnan et al. | 345/544 |
| 6,088,047 A * | 7/2000 | Bose et al. | 345/547 |
| 6,104,416 A * | 8/2000 | McGuinness | 345/544 |
| 6,301,299 B1 * | 10/2001 | Sita et al. | 375/240.01 |
| 6,377,628 B1 * | 4/2002 | Schultz et al. | 375/240.26 |
| 6,900,845 B1 * | 5/2005 | Christopher et al. | 348/445 |
| 6,989,837 B2 * | 1/2006 | Gu et al. | 345/558 |
| 7,126,992 B2 * | 10/2006 | Chiang et al. | 375/240.24 |
| 7,190,368 B2 * | 3/2007 | Linzer et al. | 345/536 |
| 2003/0206658 A1 * | 11/2003 | Mauro et al. | 382/239 |
| 2004/0169759 A1 * | 9/2004 | Kikuchi | 348/333.12 |
| 2004/0183825 A1 * | 9/2004 | Stauder et al. | 345/723 |
| 2006/0038821 A1 * | 2/2006 | Iwata | 345/537 |

* cited by examiner

Primary Examiner — John Strege
(74) Attorney, Agent, or Firm — Thomas | Horstemeyer, LLP

(57) ABSTRACT

Certain embodiments of the invention provide a method and apparatus for DRAM 2D video word formatting. In one aspect of the invention, words of data in a DRAM may be arranged for optimal DRAM operating efficiency. The data organization may utilize a 2-dimensional array of samples, for example. In one embodiment of the invention, a 128-bit or 16-byte word or GWord of DRAM may include an 8×2 array of luma samples, comprising 8 horizontal samples and 2 vertical samples from one field, for example. In this regard, either both may be even lines or both may be odd lines. Various other 2-dimensional arrangements may be chosen according to the demands of the video format being processed in accordance with various embodiments of the invention.

20 Claims, 7 Drawing Sheets

| $Y_{00}$ | | $Y_{01}$ | $Y_{02}$ | | $Y_{03}$ | $Y_{04}$ | | $Y_{05}$ | $Y_{06}$ | | $Y_{07}$ |
|---|---|---|---|---|---|---|---|---|---|---|---|
| | $Cr/Cb_{00}$ | | | $Cr/Cb_{02}$ | | | $Cr/Cb_{04}$ | | | $Cr/Cb_{06}$ | |
| $Y_{10}$ | | $Y_{11}$ | $Y_{12}$ | | $Y_{13}$ | $Y_{14}$ | | $Y_{15}$ | $Y_{16}$ | | $Y_{17}$ |
| | | | | | | | | | | | |
| $Y_{20}$ | | $Y_{21}$ | $Y_{22}$ | | $Y_{23}$ | $Y_{24}$ | | $Y_{25}$ | $Y_{26}$ | | $Y_{27}$ |
| | $Cr/Cb_{20}$ | | | $Cr/Cb_{22}$ | | | $Cr/Cb_{24}$ | | | $Cr/Cb_{26}$ | |
| $Y_{30}$ | | $Y_{31}$ | $Y_{32}$ | | $Y_{33}$ | $Y_{34}$ | | $Y_{35}$ | $Y_{36}$ | | $Y_{37}$ |
| | | | | | | | | | | | |
| $Y_{40}$ | | $Y_{41}$ | $Y_{42}$ | | $Y_{43}$ | $Y_{44}$ | | $Y_{45}$ | $Y_{46}$ | | $Y_{47}$ |
| | $Cr/Cb_{40}$ | | | $Cr/Cb_{42}$ | | | $Cr/Cb_{44}$ | | | $Cr/Cb_{46}$ | |
| $Y_{50}$ | | $Y_{51}$ | $Y_{52}$ | | $Y_{53}$ | $Y_{54}$ | | $Y_{55}$ | $Y_{56}$ | | $Y_{57}$ |
| | | | | | | | | | | | |

FIGURE 1A

| $Y_{00}$ | | $Y_{01}$ | $Y_{02}$ | | $Y_{03}$ | $Y_{04}$ | | $Y_{05}$ | $Y_{06}$ | | $Y_{07}$ |
|---|---|---|---|---|---|---|---|---|---|---|---|
| | $Cr/Cb_{00}$ | | | $Cr/Cb_{02}$ | | | $Cr/Cb_{04}$ | | | $Cr/Cb_{06}$ | |
| $Y_{10}$ | | $Y_{11}$ | $Y_{12}$ | | $Y_{13}$ | $Y_{14}$ | | $Y_{15}$ | $Y_{16}$ | | $Y_{17}$ |
| | $Cr/Cb_{10}$ | | | $Cr/Cb_{12}$ | | | $Cr/Cb_{14}$ | | | $Cr/Cb_{16}$ | |
| $Y_{20}$ | | $Y_{21}$ | $Y_{22}$ | | $Y_{23}$ | $Y_{24}$ | | $Y_{25}$ | $Y_{26}$ | | $Y_{27}$ |
| | $Cr/Cb_{20}$ | | | $Cr/Cb_{22}$ | | | $Cr/Cb_{24}$ | | | $Cr/Cb_{26}$ | |
| $Y_{30}$ | | $Y_{31}$ | $Y_{32}$ | | $Y_{33}$ | $Y_{34}$ | | $Y_{35}$ | $Y_{36}$ | | $Y_{37}$ |
| | $Cr/Cb_{30}$ | | | $Cr/Cb_{32}$ | | | $Cr/Cb_{34}$ | | | $Cr/Cb_{36}$ | |
| $Y_{40}$ | | $Y_{41}$ | $Y_{42}$ | | $Y_{43}$ | $Y_{44}$ | | $Y_{45}$ | $Y_{46}$ | | $Y_{47}$ |
| | $Cr/Cb_{40}$ | | | $Cr/Cb_{42}$ | | | $Cr/Cb_{44}$ | | | $Cr/Cb_{46}$ | |
| $Y_{50}$ | | $Y_{51}$ | $Y_{52}$ | | $Y_{53}$ | $Y_{54}$ | | $Y_{55}$ | $Y_{56}$ | | $Y_{57}$ |
| | $Cr/Cb_{50}$ | | | $Cr/Cb_{52}$ | | | $Cr/Cb_{54}$ | | | $Cr/Cb_{56}$ | |

FIGURE 1B

| GW0 : $Y_{00}...Y_{07}$ | GW1 : $Y_{08}...Y_{0,15}$ |
|---|---|
| GW2 : $Y_{10}...Y_{17}$ | GW3 : $Y_{18}...Y_{1,15}$ |
| GW0 : $Y_{20}...Y_{27}$ | GW1 : $Y_{28}...Y_{2,15}$ |
| GW2 : $Y_{30}...Y_{37}$ | GW3 : $Y_{38}...Y_{3,15}$ |
| GW4 : $Y_{40}...Y_{47}$ | GW5 : $Y_{48}...Y_{4,15}$ |
| GW6 : $Y_{50}...Y_{57}$ | GW7 : $Y_{58}...Y_{5,15}$ |
| GW4 : $Y_{60}...Y_{67}$ | GW5 : $Y_{68}...Y_{6,15}$ |
| GW6 : $Y_{70}...Y_{77}$ | GW7 : $Y_{78}...Y_{7,15}$ |
| GW8 : $Y_{80}...Y_{87}$ | GW9 : $Y_{88}...Y_{8,15}$ |
| GW10: $Y_{90}...Y_{97}$ | GW11: $Y_{98}...Y_{9,15}$ |
| GW8 : $Y_{10,0}...Y_{10,7}$ | GW9 : $Y_{10,8}...Y_{10,15}$ |
| GW10: $Y_{11,0}...Y_{11,7}$ | GW11: $Y_{11,8}...Y_{11,15}$ |
| GW12 : $Y_{12,0}...Y_{12,7}$ | GW13 : $Y_{12,8}...Y_{12,15}$ |
| GW14 : $Y_{13,0}...Y_{13,7}$ | GW15 : $Y_{13,8}...Y_{13,15}$ |
| GW12 : $Y_{14,0}...Y_{14,7}$ | GW13 : $Y_{14,8}...Y_{14,15}$ |
| GW14 : $Y_{15,0}...Y_{15,7}$ | GW15 : $Y_{15,8}...Y_{15,15}$ |

| GW0 : $Cr/Cb_{00}...Cr/Cb_{06}$ | GW1 : $Cr/Cb_{08}...Cr/Cb_{0,14}$ |
|---|---|
| GW2 : $Cr/Cb_{20}...Cr/Cb_{26}$ | GW3 : $Cr/Cb_{28}...Cr/Cb_{2,14}$ |
| GW0 : $Cr/Cb_{40}...Cr/Cb_{46}$ | GW1 : $Cr/Cb_{48}...Cr/Cb_{4,14}$ |
| GW2 : $Cr/Cb_{60}...Cr/Cb_{66}$ | GW3 : $Cr/Cb_{68}...Cr/Cb_{6,14}$ |
| GW4 : $Cr/Cb_{80}...Cr/Cb_{86}$ | GW5 : $Cr/Cb_{88}...Cr/Cb_{8,14}$ |
| GW6 : $Cr/Cb_{10,0}...Cr/Cb_{10,6}$ | GW7 : $Cr/Cb_{10,8}...Cr/Cb_{10,14}$ |
| GW4 : $Cr/Cb_{12,0}...Cr/Cb_{12,6}$ | GW5 : $Cr/Cb_{12,8}...Cr/Cb_{12,14}$ |
| GW6 : $Cr/Cb_{14,0}...Cr/Cb_{14,6}$ | GW7 : $Cr/Cb_{14,8}...Cr/Cb_{14,14}$ |

FIGURE 5A

| | |
|---|---|
| GW0 : Cr/Cb$_{00}$...Cr/Cb$_{06}$ | GW1 : Cr/Cb$_{08}$...Cr/Cb$_{0,14}$ |
| GW2 : Cr/Cb$_{10}$...Cr/Cb$_{16}$ | GW3 : Cr/Cb$_{18}$...Cr/Cb$_{1,14}$ |
| GW0 : Cr/Cb$_{20}$...Cr/Cb$_{26}$ | GW1 : Cr/Cb$_{28}$...Cr/Cb$_{2,14}$ |
| GW2 : Cr/Cb$_{30}$...Cr/Cb$_{36}$ | GW3 : Cr/Cb$_{68}$...Cr/Cb$_{6,14}$ |
| GW4 : Cr/Cb$_{40}$...Cr/Cb$_{46}$ | GW5 : Cr/Cb$_{48}$...Cr/Cb$_{4,14}$ |
| GW6 : Cr/Cb$_{50}$...Cr/Cb$_{56}$ | GW7 : Cr/Cb$_{58}$...Cr/Cb$_{5,14}$ |
| GW4 : Cr/Cb$_{60}$...Cr/Cb$_{66}$ | GW5 : Cr/Cb$_{68}$...Cr/Cb$_{6,14}$ |
| GW6 : Cr/Cb$_{70}$...Cr/Cb$_{76}$ | GW7 : Cr/Cb$_{78}$...Cr/Cb$_{7,14}$ |
| GW8 : Cr/Cb$_{80}$...Cr/Cb$_{86}$ | GW9 : Cr/Cb$_{88}$...Cr/Cb$_{8,14}$ |
| GW10: Cr/Cb$_{90}$...Cr/Cb$_{96}$ | GW11: Cr/Cb$_{98}$...Cr/Cb$_{9,14}$ |
| GW8 : Cr/Cb$_{10,0}$...Cr/Cb$_{10,6}$ | GW9 : Cr/Cb$_{10,8}$...Cr/Cb$_{10,14}$ |
| GW10: Cr/Cb$_{11,0}$...Cr/Cb$_{11,6}$ | GW11: Cr/Cb$_{11,8}$...Cr/Cb$_{11,14}$ |
| GW12: Cr/Cb$_{12,0}$...Cr/Cb$_{12,6}$ | GW13: Cr/Cb$_{12,8}$...Cr/Cb$_{12,14}$ |
| GW14: Cr/Cb$_{13,0}$...Cr/Cb$_{13,6}$ | GW15: Cr/Cb$_{13,8}$...Cr/Cb$_{13,14}$ |
| GW12: Cr/Cb$_{14,0}$...Cr/Cb$_{14,6}$ | GW13: Cr/Cb$_{14,8}$...Cr/Cb$_{14,14}$ |
| GW14: Cr/Cb$_{15,0}$...Cr/Cb$_{15,6}$ | GW15: Cr/Cb$_{15,8}$...Cr/Cb$_{15,14}$ |

FIGURE 5B

| 127-120 | 119-112 | 111-104 | 103-96 | 95-88 | 87-80 | 79-72 | 71-64 | 63-56 | 55-48 | 47-40 | 39-32 | 31-24 | 23-16 | 15-8 | 7-0 |
|---|---|---|---|---|---|---|---|---|---|---|---|---|---|---|---|
| $Y_{00}$ | $Y_{01}$ | $Y_{02}$ | $Y_{03}$ | $Y_{04}$ | $Y_{05}$ | $Y_{06}$ | $Y_{07}$ | $Y_{20}$ | $Y_{21}$ | $Y_{22}$ | $Y_{23}$ | $Y_{24}$ | $Y_{25}$ | $Y_{26}$ | $Y_{27}$ |

FIGURE 6A

| 127-120 | 119-112 | 111-104 | 103-96 | 95-88 | 87-80 | 79-72 | 71-64 | 63-56 | 55-48 | 47-40 | 39-32 | 31-24 | 23-16 | 15-8 | 7-0 |
|---|---|---|---|---|---|---|---|---|---|---|---|---|---|---|---|
| $Cb_{00}$ | $Cb_{02}$ | $Cr_{00}$ | $Cr_{02}$ | $Cb_{04}$ | $Cb_{06}$ | $Cr_{04}$ | $Cr_{06}$ | $Cb_{40}$ | $Cb_{42}$ | $Cr_{40}$ | $Cr_{42}$ | $Cb_{44}$ | $Cb_{46}$ | $Cr_{44}$ | $Cr_{46}$ |

FIGURE 6B

| 127-120 | 119-112 | 111-104 | 103-96 | 95-88 | 87-80 | 79-72 | 71-64 | 63-56 | 55-48 | 47-40 | 39-32 | 31-24 | 23-16 | 15-8 | 7-0 |
|---|---|---|---|---|---|---|---|---|---|---|---|---|---|---|---|
| $Cb_{00}$ | $Cb_{02}$ | $Cr_{00}$ | $Cr_{02}$ | $Cb_{04}$ | $Cb_{06}$ | $Cr_{04}$ | $Cr_{06}$ | $Cb_{08}$ | $Cb_{0,10}$ | $Cr_{08}$ | $Cr_{0,10}$ | $Cb_{0,12}$ | $Cb_{0,14}$ | $Cr_{0,12}$ | $Cr_{0,14}$ |

FIGURE 6C

METHOD AND APPARATUS FOR DRAM 2D VIDEO WORD FORMATTING

PRIORITY CLAIM

This application claims priority to "Method and Apparatus for DRAM 2D Video Word Formatting", Provisional Application for Patent Ser. No. 60/472,182 filed May 21, 2003, by MacInnis.

BACKGROUND OF THE INVENTION

Certain embodiments of the invention relate to the field of compression and decompression of digital video signals, also referred to as coding, or encoding, and decoding. More specifically, certain embodiments of the invention relate to a method and apparatus for DRAM 2D video word formatting.

In some conventional systems that perform compression or decompression of digital video, one or more pictures or pictures or fields of video may be stored in dynamic random access memory (DRAM). The video data in DRAM is stored in a format that may be chosen by the system designer. In certain instances, there are conflicting goals for the choice of the DRAM storage format of video pictures.

Video encoders and decoders may use specialized hard wired logic, software operating on general purpose processors, software on specialized processors, or some combination of these. Digital video used in high volume applications such as digital video broadcasts, storage, and video on demand (VOD), most commonly utilizes the format known as MPEG-2, following the main profile of MPEG-2. These high volume applications are utilized in for example, terrestrial broadcast, digital cable systems, digital satellite systems, digital video discs (DVD), video over DSL, and other applications. Main profile specifies that video pictures are defined to use the so-called 4:2:0 sample format. In the 4:2:0 format, chroma sampling is defined such that there is one chroma component pair, for example Cb and Cr, for each pixel (2×2) set of luma samples. Similar 4:2:0 sampling is also used in other video formats, including MPEG-1 and proprietary formats.

DRAM systems and/or sub-systems have Word widths that are determined by the design of the DRAM system or sub-system. As demand for system performance continues to increase, the DRAM word width tends to increase accordingly. For example, in many MPEG-2 main profile at main level (MP@ML) decoders, the DRAM word width is 32 bits. High definition, for example MPEG-2 main profile at high level (MP@HL) decoder, commonly utilize 64-bit word widths. High performance decoders with, for example, unified memory (UMA), capability for decoding multiple streams of MPEG-2 MP@HL, or those capable of decoding more advanced formats such as MPEG-4 AVC, may utilize wider DRAM word widths such as 128 bits or greater. The word width for double data rate (DDR) DRAM is twice the width of the data port. For example, a 64-bit DDR has a 128-bit word width. The term GWord is used herein to refer to a data word with a width of 128 bits. The term JWord is used to refer to a data word with a width of 256 bits.

In a decoder or an encoder, video data is generally arranged into pictures in DRAM, where a picture can be picture structured or field structured. Due to the nature of video compression and decompression algorithms, generally the same data structure in DRAM is used for writing decoded blocks of pixels, reading previously decoded pixels for motion compensation, for example, and for reading decoded pictures for display. Additional functions may also require DRAM access. An arrangement of data that is efficient for one of these purposes may not be the most efficient for another of these purposes.

An important decision in the design of a video encoder or decoder is the arrangement of video sample data in DRAM. Video samples are generally 8 bits per sample in most consumer applications. Typically, conventional video samples are arranged in DRAM words in raster scan order, with separate DRAM words for luma and chroma. Chroma is typically grouped such that the two chroma components, Cb and Cr, are interleaved. Therefore, a 32 bit DRAM word may contain either 4 luma samples from one scan line, or 2 chroma samples from each chroma component, again from one scan line. Similarly, a 64 bit DRAM word may contain 8 luma samples or 4 chroma sample pairs, in both cases from one scan line each, and a 128 bit DRAM word or GWord would contain 16 luma samples from one scan line or 8 chroma sample pairs from one scan line.

With regard to displaying digital video, these arrangements of video samples in DRAM are efficient and sensible, since display of video is generally in raster scan order. Similarly, such arrangements are usually efficient for writing blocks of video samples to DRAM, since most common video formats utilize a macroblock structure wherein each macroblock is 16 pixels wide. However, such arrangements may be inefficient for reading video samples from DRAM for motion compensation reference data fetching.

Motion compensation generally requires reading groups of video samples from DRAM where the address, width and height of the data to be read is highly dependent on the video data being decompressed. In certain instances, it may be possible for a video stream compliant with the applicable standard to result in a large number of DRAM reads from DRAM addresses that result in inefficient DRAM operation. In MPEG-2 video, motion compensation blocks can be 16×16 or 16×8 samples of luma (width×height), and the blocks of samples to be read may be 16 or 17 pixels wide and 8, 9, 16 or 17 pixels high, depending on the motion vectors and other parameters found in the compressed data stream. Chroma motion compensation blocks are correspondingly reduced in size according to the chroma sampling such as 4:2:0. In more advanced video formats such as AVC, motion compensation blocks may be as small as 4×4 luma samples, with widths and heights each ranging from 4, 8, or 16 samples. Due to the effect of the 6 tap motion compensation filter in the AVC standard, the number of samples to be read from DRAM may include 5 additional samples in each dimension. As a result, a large number of possible groups of luma pixels may have to be read from DRAM, including such shapes as 9×9, 13×9, 9×13, etc. up to 21×21. There is also another set of sizes and shapes of blocks of chroma samples that may need to be read from DRAM.

The number of DRAM cycles required for motion compensation fetches may be significantly more than the number of cycles required for display or for writing to DRAM, particularly in the case of decoding worst case compliant streams. This is very significant because a well designed decoder should be able to perform all steps of decoding worst case streams in real time, and the availability of DRAM cycles may be a limiting factor in the performance of the decoder. Similar considerations apply to encoders.

Conventional arrangements of video samples in DRAM words result in inefficient use of DRAM cycles when performing motion compensation fetches, and as a result the number of DRAM cycles required for decoding may be increased. For example, with a 128 bit DRAM word arranged as 16 luma samples in raster scan order, a motion vector in the incoming bit stream may require reading a 4×4 block of luma samples where the block straddles DRAM page boundaries in both horizontal and vertical directions. As a result, 8 GWords of 128 bits each (2 horizontally and 4 vertically) would have to be read from DRAM, from possibly 4 different DRAM banks. Since there are 16 bytes of data required in this block, and each of the 8 DRAM words accesses 16 bytes, 7/8 or 87.5% of the DRAM bandwidth is wasted, plus many DRAM cycles may have to be spent to account for the use of different DRAM banks. This problem is aggravated as the DRAM word width increases.

The problem is further compounded by utilizing both frame type and field type picture codings with the types intermixed within a video stream. In frame coding, the lines of a picture are sequential from top to bottom. In field coding, a frame is conceptually divided into two fields, namely an odd field containing the odd numbered lines, and an even field containing the even numbered lines. With the picture types intermixed within a video sequence, a motion vector could require blocks of video samples to be read from frame coded pictures, top field pictures or bottom field pictures. Accordingly, it is desirable to find improved arrangements of data in DRAM that result in more efficient use of DRAM cycles when performing all the of the DRAM accesses required for decoding video in real time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

In one embodiment, there is presented a method for storing a portion of a video picture by storing pixels from two or more rows of the picture in a data word. A picture may be a frame picture or a field picture. The word "picture", as used herein, may refer to a field picture, a pair of field pictures, or a frame picture, according go the context.

In another embodiment, there is presented a system for decoding a picture. The system comprises a video decoder and a frame buffer. The video decoder decodes the picture. The frame buffer stores pixels from two or more rows of the picture in a data word.

In another embodiment, there is presented a circuit for decoding a picture. The circuit includes a processor and a memory connected to the processor. The memory stores a plurality of executable instructions. Execution of the executable instructions by the processor causes storing pixels from two or more rows of the picture in a data word.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a block diagram of a picture according to the 4:2:0 format

FIG. 1B is a block diagram of a picture according to the 4:2:2 format;

FIG. 5A is a block diagram mapping an exemplary portion p to Gwords, wherein 4:2:0 sampling is used;

FIG. 5B is a block diagram mapping the chroma part of portion p to Gwords, wherein 4:2:2 sampling is used;

FIG. 6A is a table describing an exemplary Gword storing luminance pixels Y in accordance with an embodiment of the present invention;

FIG. 6B is a block diagram describing an exemplary Gword storing chrominance pixels C in accordance with an embodiment of the present invention with 4:2:0 sampling; and FIG. 6C is a block diagram describing an exemplary Gword storing chrominance pixels C in accordance with an embodiment of the present invention with 4:2:2 sampling;

DETAILED DESCRIPTION OF THE INVENTION

Figure 2:
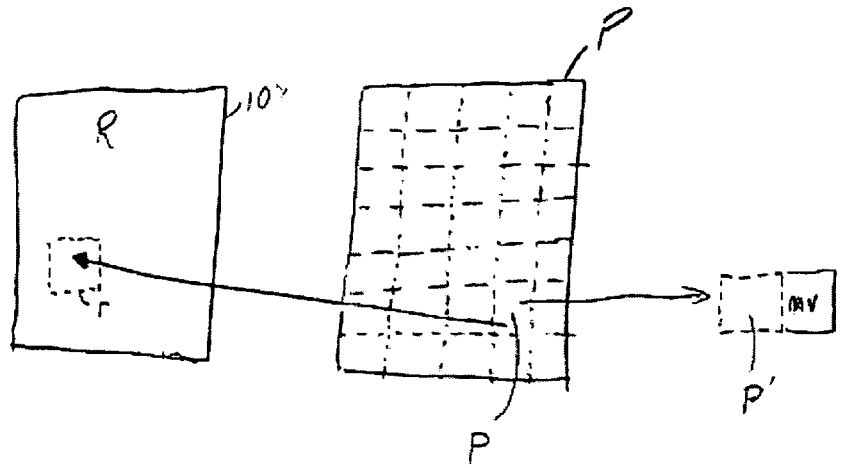
FIG. 2 is a block diagram describing motion compensation.

Certain embodiments of the invention provide a method and apparatus for DRAM 2D video word formatting. In one aspect of the invention, words of data in a DRAM may be arranged for optimum DRAM operating efficiency. The data organization may utilize a 2-dimensional array of samples, for example. In one embodiment of the invention, a 128-bit or 16-byte word or GWord of DRAM may include an 8×2 array of luma samples, comprising 8 horizontal samples and 2 vertical samples from one field. In this regard, either both may be even lines or both may be odd lines. Accordingly, chroma samples may be arranged such that a 128 bit DRAM word contains the chroma components of an 8×4 array of pixels. Various other 2-dimensional arrangements may be chosen according to the demands of the video format being processed in accordance with various embodiments of the invention. The arrangement of video samples may change dynamically according to the format or other details of the video streams being decoded.

In accordance with an embodiment of the invention, video data samples may be arranged in DRAM so as to minimize the maximum total number of DRAM cycles required to decode and display each picture of video. For illustrative purposes, consideration may be given to DRAM subsystems with data words which may be 128 bits wide or wider. However, the invention is not limited in this regard. Similarly, for illustrative purposes, consideration may be also given to video compression formats which may require reading and writing of small blocks of samples for motion compensation, and to formats which may require combinations of field and frame structured pictures. However, the invention is not so limited.

Two-dimensional arrays of video samples in one DRAM word may provide increased efficiency in terms of total DRAM cycles required to perform the essential functions of decoding and display. Reading one word from DRAM may result in returning all video samples in that word to the video processor. Functions that may require 2-dimensional (2D) groups of samples, such as motion compensation reads, may generally benefit directly from 2D arrangements of samples in DRAM words. Functions that do not inherently require reading 2-dimensional groups of samples, such as reading DRAM for video display, may save the values returned from DRAM into local buffer memories for use later, such as when displaying video to a subsequent scan line of the display.

Field-structured two-dimensional arrays of video samples in one DRAM word may provide additional efficiency in cases where the video compression format may include field structured pictures. Functions that may utilize 2D groups of samples from one field such as motion compensation fetches from field-structured reference pictures, may benefit directly since the arrangement of data in DRAM maps closely to the group of data samples requested. Functions that may utilize 2D groups of samples from both fields, such as motion compensation fetches from frame-structured reference pictures, may also benefit. They may also not be impaired by the field-structured arrangement of data in DRAM since the groups of samples requested generally cover multiple lines in both fields, and the data returned from the DRAM subsystem are preferably retained in internal buffers for use as required. Interlaced format display, such as interlaced TVs or monitors, may also benefit from efficient usage of DRAM read cycles. As data groups are requested and returned to provide data for one display scan line, data returned that covers one or more subsequent scan lines may be retained in a buffer for display at the appropriate time such as when the subsequent scan lines are sent to the display. Only modest size buffers may be utilized.

Progressive format display, such as progressive TVs or monitors, may also benefit from efficient usage of DRAM read cycles. As data groups are requested and returned to provide data for one display scan line, data returned that covers one or more subsequent scan lines of the same field, for example even or odd lines, may be retained in a buffer for display at an appropriate time. The subsequent time may include instances when the subsequent scan lines of the same field are sent to the display. In case of progressive display and a field structured data sample arrangement in DRAM, more temporary buffer space is typically required than for interlaced display. However, only modest buffer sizes may be required in accordance with various embodiments of the invention.

Video data comprises a series of pictures. Each picture comprises two dimensional grids of luminance Y, chroma red Cr, and chroma blue Cb pixels. The luminance pixels Y, the chroma red Cr, and the chroma blue Cb, can have one of a number of spatial relationships.

Referring now to FIG. 1A, there is illustrated a diagram of a portion of a picture according to one version of the 4:2:0 format. In this particular 4:2:0 format, the luminance pixels Y occupy positions (i,j), where i=0, 1, 2, ... and j=0, 1, 2, .... The chroma red Cr, and chroma blue Cb pixels occupy positions (2i+0.5, 2j+0.5), where i=0, 1, 2, .... and j=0, 1, 2, .... The collocated chroma red Cr and chroma blue Cb, pixels are indicated by a C. The subscript represents the integer portion of the position, i.e., position −0.5.

Referring now to FIG. 1B, there is illustrated a diagram of a portion of a picture according to one version of the 4:2:2 format. In this particular 4:2:2 format, the luminance pixels Y occupy positions (i,j), where i=0, 1, 2, ... and j=0, 1, 2, .... The chroma red Cr, and chroma blue Cb pixels occupy positions (2i+0.5, j+0.5), where i=0, 1, 2, ... and j=0, 1, 2, .... The collocated chroma red Cr and chroma blue Cb, pixels are indicated by a C. The subscript represents the integer portion of the position, i.e., position −0.5.

Referring now to FIG. 2, there is illustrated a block diagram describing motion compensation. The video comprises a series of pictures 105. Standards, such as MPEG-2 and MPEG-4 Advanced Video Coding (AVC) take advantage of temporal redundancies between the pictures 105 with algorithms that use motion compensation based prediction. The pictures 105 can be considered as snapshots in time of moving objects. With pictures 105 occurring closely in time, it is possible to represent at least some of the content of one picture 105 based on the content of another picture 105, and information regarding motion between the pictures 105.

Accordingly, segments p of one picture 105p (a predicted picture) are predicted by searching portions of another picture 105r (a reference picture) and selecting a portion r that is similar to the segment r in the predicted picture 105p. A motion vector indicates the spatial displacement between the segment p in the predicted picture 105p and the portion r in the reference picture 105r. The difference between the segment p and the portion r of the reference picture 105r is known as the prediction error. The predicted segment p can be represented by the prediction error p' and the motion vector mv. The prediction error p' can be further compressed by application of discrete cosine transformation, quantization, and Huffman coding. The predicted picture 105p is represented by the motion vector my and prediction error p' representing the segments p forming the predicted picture 105p in a data structure known as a picture. In MPEG-2 the segments p are of sizes either 16×16 or 16×8. In AVC, the segments p may be of various sizes, such as 4×4, 4×8, 8×4, 8×8, 8×16, 16×8, or 16×16. In both of these standards the term macroblock refers to 16×16 segments of pixels; these are not necessarily the same as the predicted segments p.

Figure 3:
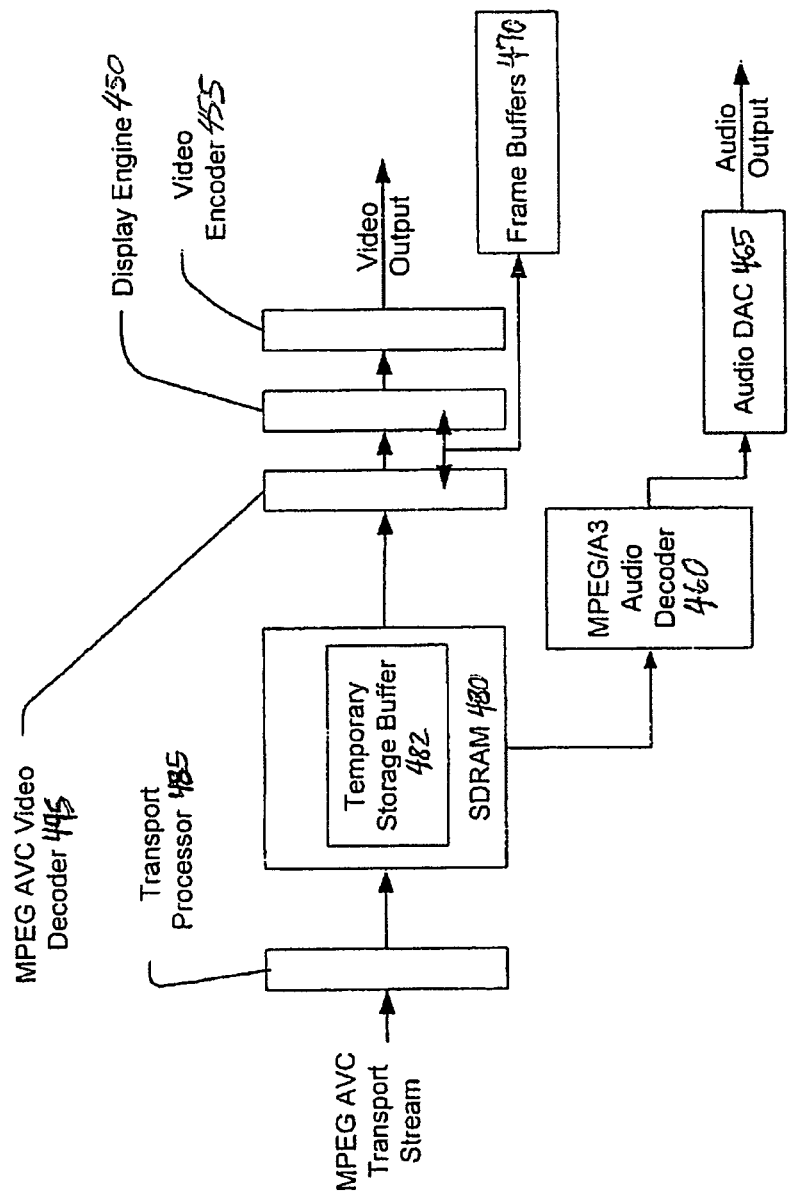
FIG. 3 is a block diagram of an exemplary circuit in accordance with an embodiment of the present invention.

Referring now to FIG. 3, there is illustrated a block diagram of an exemplary circuit in accordance with an embodiment of the present invention. Data is received and stored in a buffer 332 within SDRAM 330. The data can be received from either a communication channel or from a local memory, such as a hard disc or a DVD.

The data output from the buffer 332 is then passed to a data transport processor 335. The data transport processor 335 demultiplexes the transport stream into constituent sets of transport packets, and passes the audio transport packets to an audio decoder 360 and the video transport packets to a video transport decoder 340 and then to a video decoder 345. The audio data is then sent to the output blocks, and the video is sent to a display engine 350.

The display engine 350 scales the video picture, renders the graphics, and constructs the complete display. Once the display is ready to be presented, it is passed to a video encoder 355 where it is converted to analog video using an internal digital to analog converter (DAC). The digital audio is converted to analog in an audio digital to analog (DAC) 365.

The video decoder 345 receives and decompresses the compressed video data. While decompressing the video data, decoded pictures 105 are stored in frame buffers 370. The decoded pictures 105 are stored in frame buffers 370 to await display by the display engine 350. Additionally, the video decoder 345 accesses portions r of reference pictures 105r for decoding predicted pictures 105p.

Figure 4:
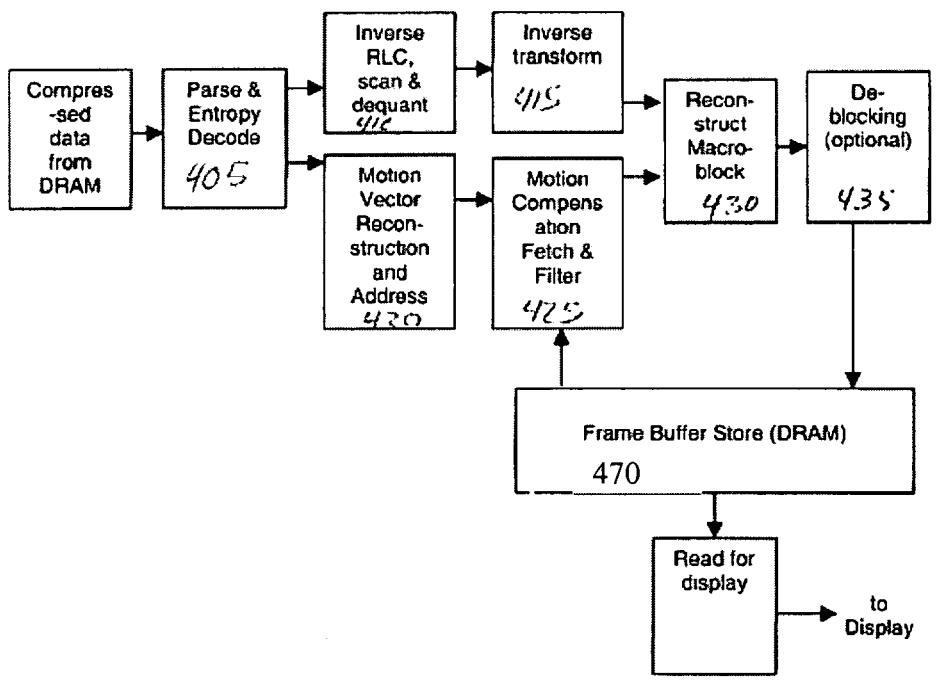
FIG. 4, is a block diagram describing the data flow of the video decoder.

Referring now to FIG. 4, there is illustrated a block diagram describing the data flow of the video decoder 345. A data structure representing a portion p of a picture 105 is parsed and entropy decoded at 405. At 410, the inverse run level code, inverse scan, and dequantization are applied to the picture. At 415, inverse transformation is applied, resulting in either the prediction error p' (in the case that the portion p is from a picture that is predicted from another picture), or the portion p (in the case that the portion p is from a picture that is not predicted from another picture).

In the case where the portion p is from a picture 105 that is predicted from another picture 105, at 420, the motion vector data is examined. The motion vector data is examined to determine the location of the segment r from a reference picture 105r that was used to encode portion p. At 425, the portion r is fetched from the frame buffer 370. At 430, the portion p is reconstructed with the prediction error p' and the segment r. At 435, deblocking can be applied to the portion p. The portion p is stored in the frame buffer 370.

The frame buffer 370 stores the pictures to await display as well as, in some cases, after display for reference. At 425, the frame buffer 370 is accessed with the address of the segment r. The pixels are arranged in the frame buffer 370 in such a way as to reduce the maximum total number of DRAM cycles required to decode and display each picture. The frame buffer 370 preferably comprises DRAM with 16 byte words known as giant words (Gwords).

In one embodiment, the frame buffer 370 may have a word size of 128 bits or 16 bytes. One word may be mapped to 8 horizontally adjacent luma pixels in 2 rows, e.g., $Y_{00}$, $Y_{01}, \ldots Y_{07}, Y_{20}, Y_{21}, \ldots, Y_{27} \ldots$ picturepicture For chroma pixels, one word may be mapped to four horizontally adjacent chroma red pixels Cr in two rows, the four horizontally adjacent chroma blue pixels Cb that are collocated with the four horizontally adjacent chroma red pixels Cr, e.g., $Cr/Cb_{00}$, $Cr/Cb_{02}, \ldots Cr/Cb_{06}, Cr/Cb_{20}, Cr/Cb_{22}, \ldots Cr/Cb_{26}, \ldots$. The two rows of horizontally adjacent luma pixels are consecutive alternating rows in terms of frame numbering, e.g., rows 0 and 2 for luma pixels. The consecutive alternating rows are adjacent rows from the same field. The two rows of horizontally adjacent chroma pixels are also consecutive alternating rows in terms of frame numbering which are adjacent rows from one field, e.g., rows 0 and 4 in 4:2:0, and rows 0 and 2 in 4:2:2.

Referring now to FIG. 5A, there is illustrated a block diagram mapping an exemplary portion p to Gwords, wherein 4:2:0 sampling is used. The portion p comprises a 16×16 array of luminance pixels, an 8×8 array of red chrominance pixels Cr, and an 8×8 array of blue chrominance pixels Cb. The foregoing structures form what is known as a macroblock.

The luminance pixels of one 16×16 macroblock map to 16 Gwords. Each Gword contains 8 horizontally adjacent luma pixels Y, from two rows. The luminance pixels in the portion p cover 2 Gwords horizontally and 8 Gwords vertically. The chrominance pixels map to Gwords. Each Gword contains four horizontally adjacent chroma red Cr pixels from two rows and the four horizontally adjacent chroma blue Cb collocated with the four horizontally adjacent chroma red Cr pixels. The chrominance pixels in the portion p cover 2 Gwords horizontally and 4 Gwords vertically.

Referring now to FIG. 5B, there is illustrated a block diagram mapping the chroma part of portion p to Gwords, wherein 4:2:2 sampling is used. The portion p comprises a 16×16 array of luminance pixels, a 16×8 array of red chrominance pixels Cr, and a 16×8 array of blue chrominance pixels Cb. The foregoing structures form what is known as a macroblock.

The luma pixels are mapped as shown in FIG. 5A. The chrominance pixels map to 16 Gwords. Each Gword contains four horizontally adjacent chroma red Cr pixels from two rows and the four horizontally adjacent chroma blue Cb collocated with the four horizontally adjacent chroma red Cr pixels. The chrominance pixels in the portion p cover 2 Gwords horizontally and 8 Gwords vertically.

FIG. 6A is a block diagram describing an exemplary Gword storing luminance pixels Y in accordance with an embodiment of the present invention. The gword comprises 128 bits, 127 . . . 0, where bit 127 is the most significant and 0 is the least significant. As can be seen, each set of eight bits forming a byte stores a luma pixel. For example, bits 127 . . . 120 store $Y_{00}$. The first half of the bits, bits 127 . . . 64 stores eight horizontally adjacent luma pixels in one row, e.g., $Y_{00} \ldots Y_{07}$, while the bits 63 . . . 0 store eight horizontally adjacent luma pixels in another row, e.g., $Y_{00} \ldots Y_{07}$.

FIG. 6B is a block diagram describing an exemplary Gword storing chrominance pixels C in accordance with an embodiment of the present invention wherein 4:2:0 sampling is used. The gword comprises 128 bits, 127 . . . 0, where bit 127 is the most significant and 0 is the least significant. As can be seen, each set of eight bits forming a byte stores a chroma pixel. For example, bits 127 . . . 120 store $Cb_{00}$. As can be seen, the chroma red and chroma blue pixels are stored as alternating pairs. FIG. 6C is a block diagram describing an exemplary Gword with 4:2:2 sampling.

Alternative embodiments may use other 2-dimensional arrays of samples per DRAM word. Examples include but are not limited to:

4×4 field structured array of luminance samples in one 16 byte word

8×4 field structured array of luma samples in one 32 byte Jword

16×2 field structured array of luma samples in one 32 byte Jword

8×2 frame structured array of luma samples (consecutive lines from one frame) in one 16 byte Gword 8×4 frame structured array of luminance samples in one 32 byte Jword 16×2 frame structured array of luma samples in one 32 byte Jword 8×2 frame structured array of chroma samples in one 16 byte Gword 8×4 field structured array of chrominance samples in one 32 byte Jword 8×4 frame structured array of chrominance samples in one 32 byte Jword 8×2 field or frame structured array of one component (Cb or Cr) of chrominance samples in one Gword 8×4 field or frame structured array of one component (Cb or Cr) of chrominance samples in one Jword.

Figure 7:
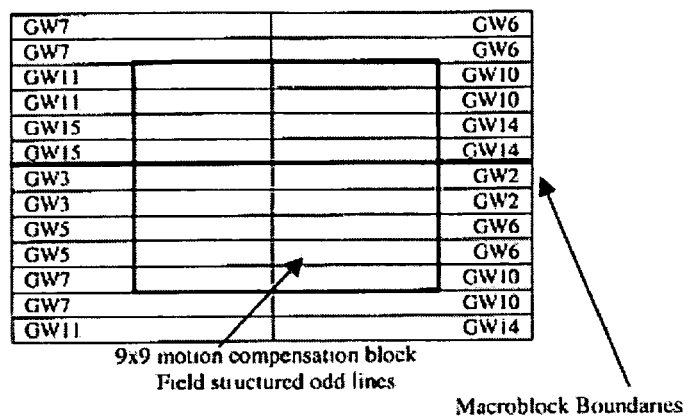
FIG. 7 is a block diagram describing a structured motion compensation luminance pixel block overlapping 4 macroblocks.

Referring now to FIG. 7, there is illustrated a block diagram describing a structured motion compensation luminance pixel block of size 9×9 overlapping 4 macroblocks. As can be seen, the number of Gwords that must be fetched for the luma pixels is 10.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for storing a portion of a picture, said method comprising:
   receiving compressed video data from memory;
   processing the video data to form pictures, wherein a processed picture comprises luma pixel components, chroma red pixel components, and chroma blue pixel components;
   storing two or more horizontally adjacent chroma red pixel components from each of two or more pixel rows of the processed picture and two or more horizontally adjacent chroma blue pixel components from said each of two or more pixel rows of the processed picture as a first data word; and
   storing horizontally adjacent remaining chroma red pixel components from said each of two or more pixel rows of the processed picture and horizontally adjacent remaining chroma blue pixel components from said each of two or more pixel rows of the processed picture as a second data word.

2. The method of claim 1, wherein the two or more pixel rows comprise adjacent rows of a field.

3. The method of claim 1, further comprising:
   storing four or more horizontally adjacent luma pixel components from said each of two or more pixel rows of the processed picture as a third data word.

4. The method of claim 1, further comprising:
   storing eight horizontally adjacent luma pixel components from said each of two or more pixel rows of the processed picture as a third data word.

5. The method of claim 1, wherein said two or more horizontally adjacent chroma red pixel components comprise four horizontally adjacent chroma red pixel components and said two or more horizontally adjacent chroma blue pixel components comprise four horizontally adjacent chroma blue pixel components.

6. The method of claim 1, wherein the first data word comprises a 128-bit word.

7. The method of claim 1, wherein the two or more pixel rows comprise adjacent rows of a frame.

8. A system for decoding a picture, said system comprising:
   a video decoder for decoding the picture, wherein a decoded picture comprises luma pixel components, chroma red pixel components, and chroma blue pixel components; and
   a frame buffer operable to store two or more horizontally adjacent chroma red pixel components from each of two or more pixel rows of the decoded picture and two or more horizontally adjacent chroma blue pixel components from said each of two or more pixel rows of the decoded picture as a first data word; and
   the frame buffer operable to further store horizontally adjacent remaining chroma red pixel components from said each of two or more pixel rows of the decoded picture and horizontally adjacent remaining chroma blue pixel components from said each of two or more pixel rows of the decoded picture as a second data word.

9. The system of claim 8, wherein the two or more pixel rows comprise adjacent rows of a field.

10. The system of claim 8, wherein the frame buffer is further operable to store four or more horizontally adjacent luma pixel components from said each of two or more pixel rows of the decoded picture as a third data word.

11. The system of claim 8, wherein the frame buffer is further operable to store eight horizontally adjacent luma pixel components from said each of two or more pixel rows of the decoded picture as a third data word.

12. The system of claim 8, wherein said two or more horizontally adjacent chroma red pixel components comprise four horizontally adjacent chroma red pixel components and said two or more horizontally adjacent chroma blue pixel components comprise four horizontally adjacent chroma blue pixel components.

13. The system of claim 8, wherein the first data word comprises a 256-bit word.

14. The system of claim 8, wherein the two or more pixel rows comprise adjacent rows of a frame.

15. A circuit for processing a picture, said circuit comprising:
   a processor; and
   a memory operably coupled to the processor, said memory storing a plurality of executable instructions, wherein execution of the executable instructions by the processor causes:
   receiving compressed video data from the memory;
   processing the video data to form pictures, wherein a processed picture comprises luma pixel components, chroma red pixel components, and chroma blue pixel components;
   storing two or more horizontally adjacent chroma red pixel components from each of two or more pixel rows of the processed picture and two or more horizontally adjacent chroma blue pixel components from said each of two or more pixel rows of the picture as a first data word; and
   storing horizontally adjacent remaining chroma red pixel components from said each of two or more pixel rows of the processed picture and horizontally adjacent remaining chroma blue pixel components from said each of two or more pixel rows of the processed picture as a second data word.

16. The circuit of claim 15, wherein the two or more pixel rows comprise adjacent rows of a field.

17. The circuit of claim 15, wherein the executable instructions are further configured to cause the processor to store four or more horizontally adjacent luma pixel components from said each of two or more pixel rows of the processed picture as a third data word.

18. The circuit of claim 15, wherein the executable instructions are further configured to cause the processor to store eight horizontally adjacent luma pixel components from said each of two or more pixel rows of the processed picture as a third data word.

19. The circuit of claim 15, wherein said two or more horizontally adjacent chroma red pixel components comprise four horizontally adjacent chroma red pixel components and said two or more horizontally adjacent chroma blue pixel components comprise four horizontally adjacent chroma blue pixel components.

20. The circuit of claim 15, wherein the first data word comprises a 128-bit word.

* * * * *